May 24, 1966  R. A. WELCH  3,253,123
LIQUID ELECTRIC HEATER UNIT
Filed Nov. 24, 1961  3 Sheets-Sheet 1
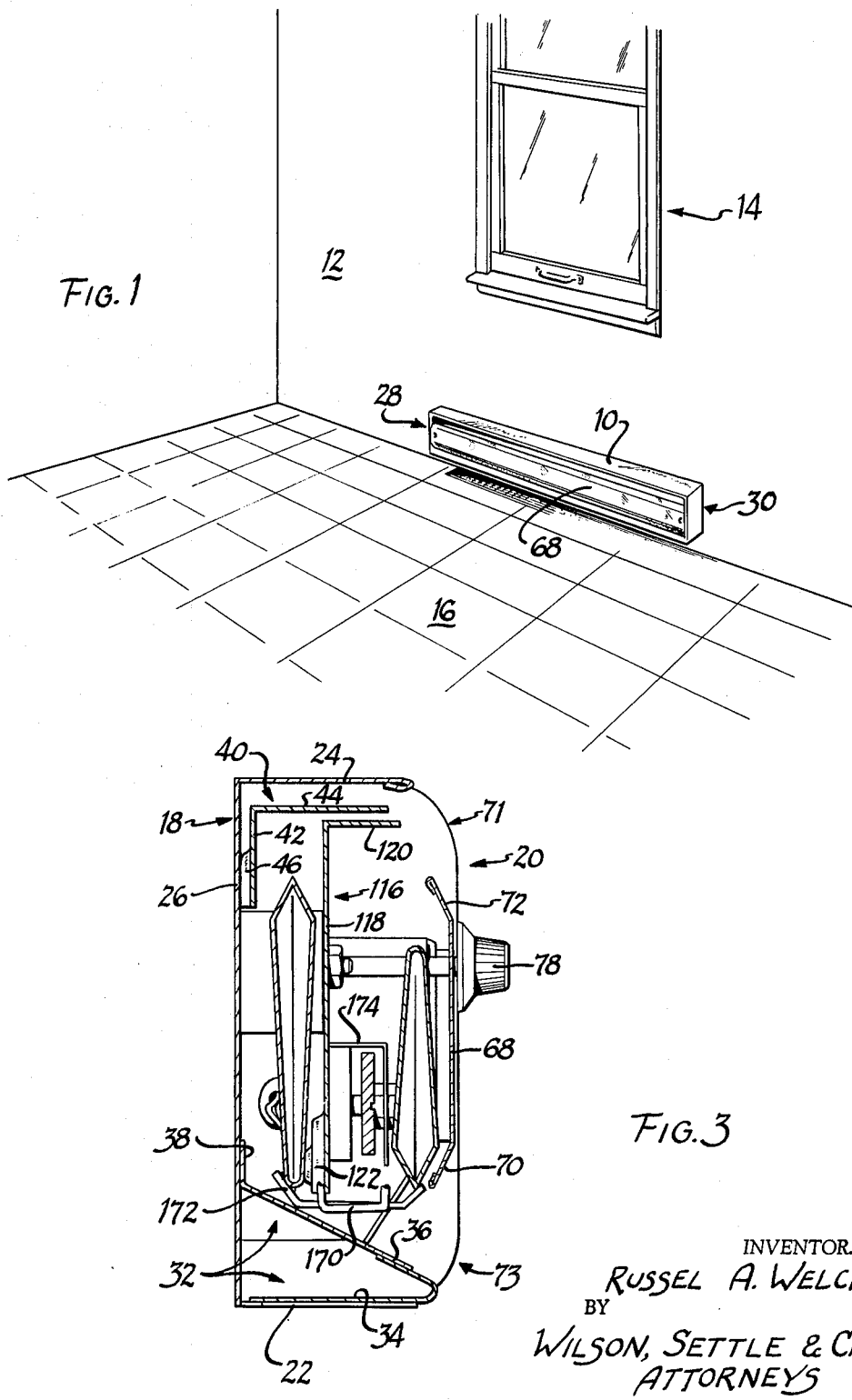
INVENTOR.
RUSSEL A. WELCH
BY
WILSON, SETTLE & CRAIG
ATTORNEYS

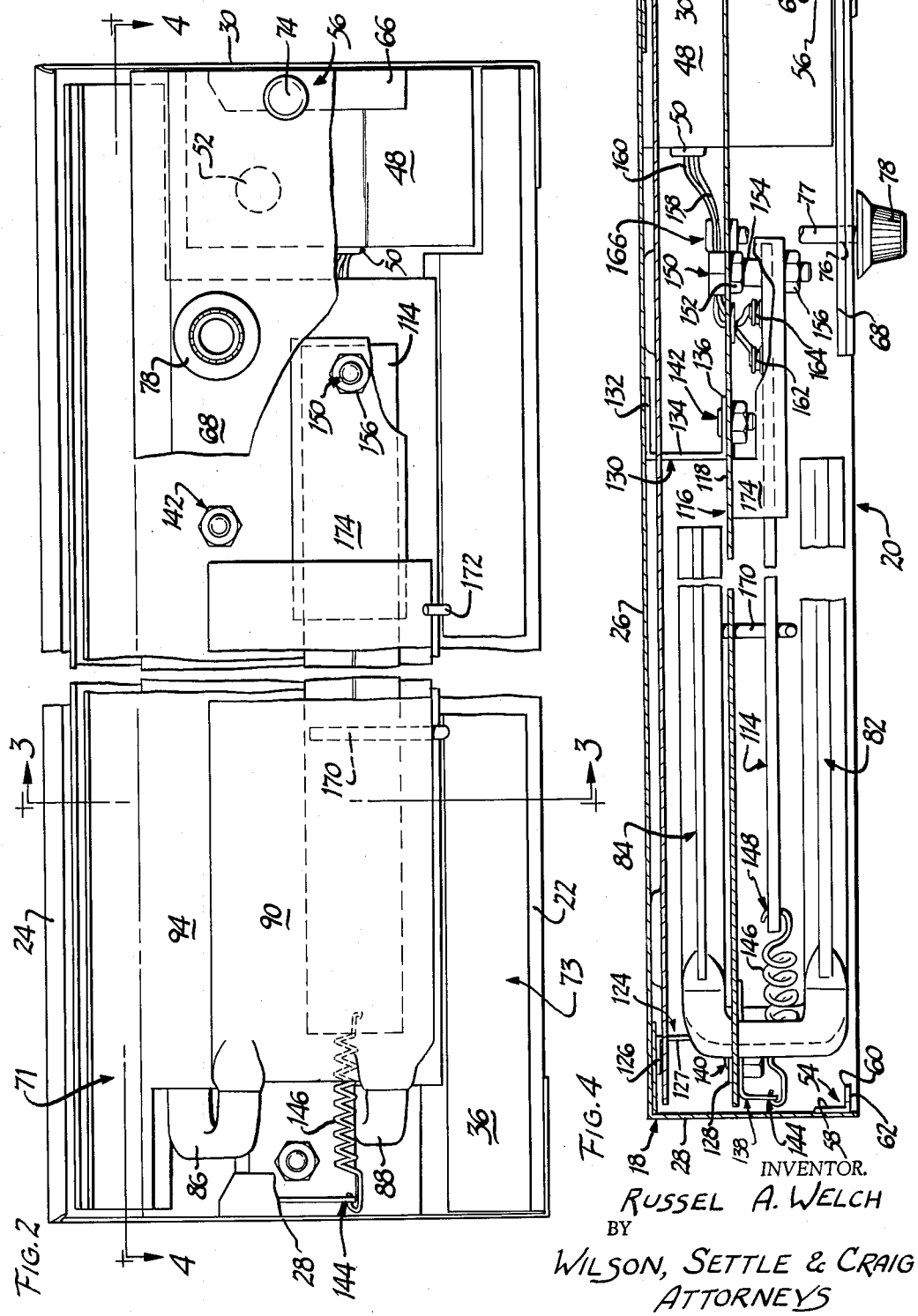

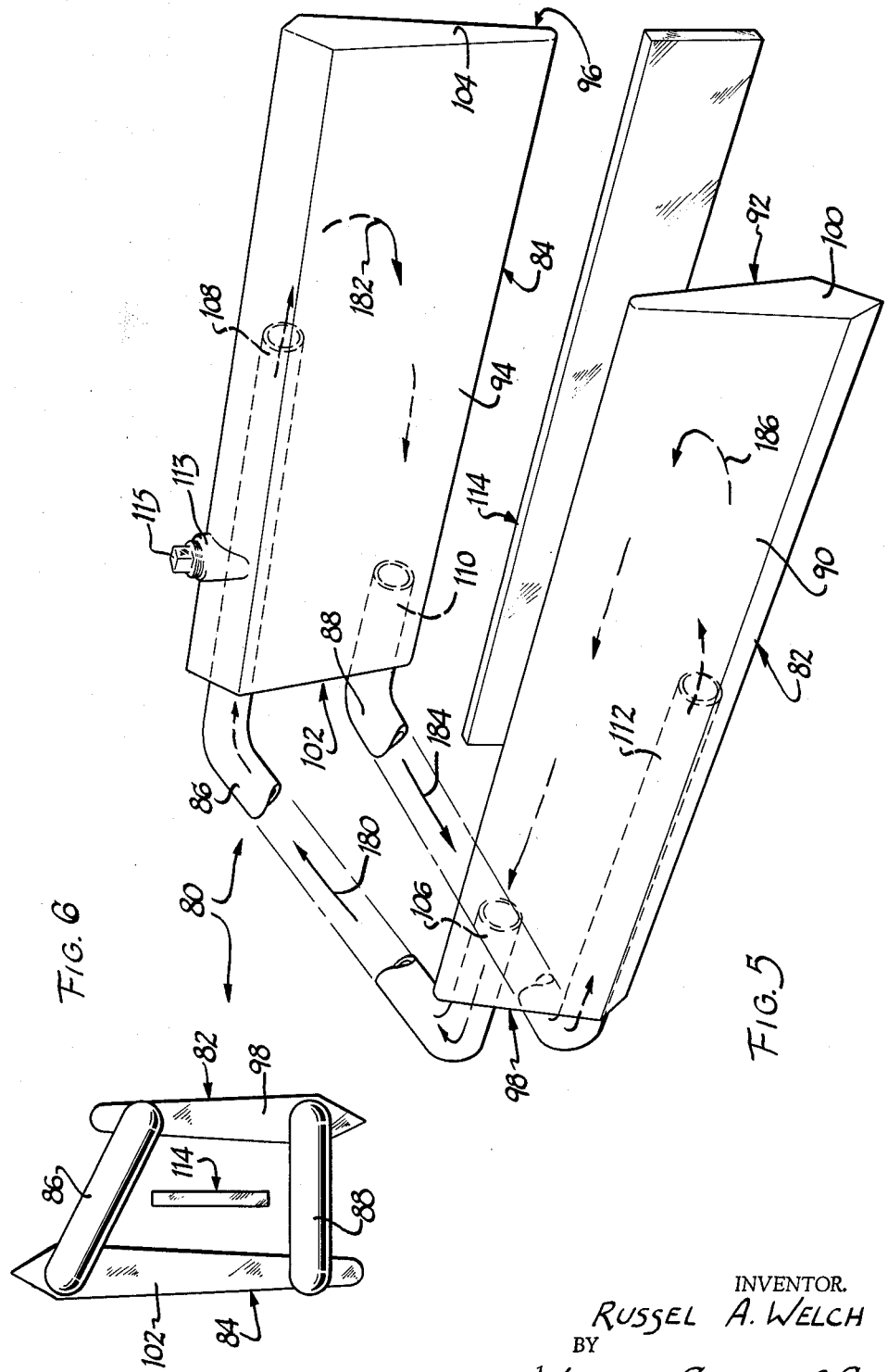

United States Patent Office 3,253,123
Patented May 24, 1966

3,253,123
LIQUID ELECTRIC HEATER UNIT
Russel A. Welch, St. Clair Shores, Mich., assignor of forty-five percent to Eugene A. Casaroli, Grosse Pointe, and five percent to Paul G. Hogue, Mount Clemens, Mich.
Filed Nov. 24, 1961, Ser. No. 154,721
10 Claims. (Cl. 219—365)

This invention relates to space heaters, and more particularly to heaters of the convection type utilizing in combination a radiation-producing element and a liquid filled cell of the convection type wherein substantially all of the radiant energy produced by the heating element is converted into convection heat through the medium of the liquid filled cell.

Heretofore, space heaters utilizing electrical energy have generally been characterized by the fact that they rely for heating largely on the radiant energy produced by an electrically actuated heating element. This feature has produced an undesirable characteristic in the prior art units in that a substantial amount of the radiant energy produced by the unit is lost from the space, such as a domestic dwelling, that it is designed to heat. Thus, very substantial amounts of the radiant energy pass out through windows, doors and similar glassed openings and are lost to the atmosphere. This loss, of course, results in substantially reduced heating efficiencies of such units. Accordingly, the prior art units have received only limited acceptance in competition with other types of space heaters such as fuel fired hot water system, air convection systems and the like.

Although, the radiant energy produced by the prior heaters of the electrically actuated type has provided what is called "immediate comfort" when they are turned on, this comfort is immediately lost when the units are deactivated. Thus, there is no lingering comfort provided inasmuch as all heating stops as soon as the units are shut off.

It would thus provide a substantial advance in the art if the radiant energy losses inherent in the prior art structures could be substantially reduced or eliminated and if at the same time a more uniform comfort zone could be provided that would be of long lasting duration, thus providing substantial hold-over with longer cycling.

It is accordingly an important object of the present invention to provide a novel space heater of the electrically actuated type.

Another object is to provide a space heater of the electrically actuated type wherein radiant energy produced by an electrically actuated heating element is substantially completely converted into convection heat and thereby losses through openings to the atmosphere are reduced with substantial increases in efficiency.

A further object is to provide a method for heating air wherein radiant energy is converted into convection heat utilizing a fluid cell.

A still further object is to provide an improved space heater of the electrically actuated type wherein an electrically actuated radiant heating element is employed in combination with a convection heat producing fluid cell utilizing circulating fluid flow.

A further object is to provide an electrically actuated heater of the convection type wherein an electrically actuated heater of the radiant energy type is utilized in combination with a convection heat producing fluid cell and a baffle providing improved hold-over heating over extended periods of time after the electric heater is deactivated.

A further object is to provide a novel electrically actuated heater of the convection type wherein an electrically actuated heater is utilized to provide immediate comfort and in combination with a fluid circulation cell provides sustained comfort of substantial duration after the electrically actuated heater is deactivated to provide sustained comfort with reduced cycling.

Other objects of this invention will appear in the following description and appended claims, reference being had to the accompanying drawings forming a part of this specification wherein like reference characters designate corresponding parts in the several views.

In the drawings:

FIGURE 1 is a perspective view of the heater of the present invention mounted on a supporting wall surface of a domestic dwelling beneath a window;

FIGURE 2 is a front view with parts broken away in section of the heater of the present invention;

FIGURE 3 is a section view taken along the line 3—3 of FIGURE 2, looking in the direction of the arrows;

FIGURE 4 is a section view taken along the line 4—4 of FIGURE 2, looking in the direction of the arrows;

FIGURE 5 is an exploded perspective view illustrating the manner in which the liquid cell and the electrically actuated heating rod coact with each other; and FIGURE 6 is a left end view of the FIGURE 5 assembly.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

BRIEF PERSPECTIVE

Briefly, the invention relates to an electrically actuated space heater of the convection type utilizing in combination an elongated electric heating unit of the radiant type and a liquid filled cell wherein the cell is composed of spaced front and rear units with the electric heater therebetween so that substantially all of the radiant energy produced by the electric heater is captured by the liquid cell.

Thus, radiation losses to the atmosphere, as through openings such as windows and doors in buildings, are practically eliminated with the result that the efficiency of the unit is substantially increased as compared to prior art units where radiation alone is utilized for heating purposes. Thus, in accordance with the present invention radiant energy is converted substantially entirely into convection heat for improved efficiency, smoother, more sustained comfort and longer cycling.

The heating unit, including the electric heating element and the liquid cell, is positioned in a special sheet metal housing to permit air flow into the bottom and out the top by convection contact with the heating unit.

It is an important aspect of the invention that the fluid cell is made in the form of spaced front and rear cells that are connected in a particular fluid convection arrangement so that fluid flows freely from the front cell to the rear cell, circulating therethrough and returning for full circulation through the front cell for greatest production of convection heat. The cells are particularly configured as elongated, thin, hollow tank structures and thus provide substantial air contact surfaces for highly efficient convection heat production.

THE ENVIRONMENT

As shown in FIGURE 1, the heater 10 of the present invention is shown in one typical surrounding in which it is adapted to be utilized for heating space as in a domestic building such as a home. Thus, the heater 10 is adapted to be positioned on a wall 12 beneath a window 14 to counteract heat losses through the window. It will be noted that the heater 10 is suitably positioned at the baseboard level, just above the floor 16 so that the convection heat produced thereby will rise upwardly in front of the window 14 and overcome any cold draft condition created therefrom.

THE INVENTION.—THE HOUSING

FIGURES 2, 3 and 4 illustrate the heater of the invention in its entirety as including a housing 18, made of sheet metal in generally rectangular cross section, with an open front 20 and with bottom, top and rear walls 22, 24 and 26. The ends of the unit are closed as at 28 and 30, FIGURES 1 and 2.

As shown in FIGURE 3, an air directing baffle 32, having a horizontal lower leg 34, is positioned upon the top surface of the bottom wall 22, securement being effected by spot welding or the like. It will be noted that the central portion 36 turns back at approximately a 45° angle and thereby provides an appropriately positioned air directing surface. At the back edge of the central portion 36, an integrally formed and vertically extending attachment lip 38 is provided that is secured to the rear wall 26 as by spot welding or the like. Thus, the air-directing baffle 32 is retained in appropriate assembled relationship to the bottom 22 and back 26 of the housing 18.

At the top of the unit and adjacent the rear wall 26 and top wall 24, there is provided a spaced L-shaped baffle 40 having its vertical leg 42 positioned adjacent and parallel to the rear wall 26 and its horizontal leg 44 positioned adjacent and parallel the top wall 24. The L-shaped baffle 40 is attached to the rear wall 26 by indentations 46, spaced along the length of the vertical leg 42 and spot welded to the back wall.

As shown in FIGURES 2 and 4, the right end of the housing 18 carries a terminal box 48, having a grommetted opening 50 in the left wall thereof. The rear wall 26 of the housing 18, as shown in FIGURE 2, is provided with an access opening 52 whereby electric lead wires can be passed into the interior of the terminal box 48. Electrical connections are described later.

As best shown in FIGURES 2 and 4, each end of the housing 18 is provided with an attachment clip or bracket 54, 56. The left hand attachment clip 54 has a leg 58 secured to the left end 28 of housing 18 as by spot welding and a leg 60, parallel to the open front 20 and having a fastening aperture 62 formed therein. The right hand attachment clip or bracket 56 also comprises a leg 64, FIGURE 4, fastened to the right hand end 30 of the housing 18 as by spot welding, and a leg 66, FIGURE 2, extending parallel to the front opening 20 with a fastening aperture (hidden) therein.

As best shown in FIGURES 1, 2 and 3, a front cover plate 68 extends the length of the open front 20 and is of generally flat configuration with inwardly turned upper and lower lips 70 and 72, FIGURE 3. At each end, the front cover plate 68 is provided medially with a securement opening, through which is passed an expandable spring fastener having a head as at 74 in FIGURE 2. One opening is aligned with the aperture 62 of leg 60 of left hand attachment clip 54 and the other is aligned with the opening of the leg 66 of right hand attachment clip 56 and the snap fasteners 74 are inserted to hold the cover in place. This construction provides for easy and quick removal of the front cover 68 in the event service or adjustment are required for the unit.

As shown in FIGURE 4, an access aperture 76 is provided in the front cover 68, through which a thermostat control rod 77 is passed, after which the control knob 78 is applied to complete the assembly. Of course, when removing the front cover 68, the control knob 78 is first removed and then the front cover is snapped off.

THE FLUID CELL AND ELECTRIC HEATING ELEMENT ASSEMBLY

Before describing the manner in which the housing of the unit, just described, accommodates the fluid cell and heater unit to provide a complete assembly, reference will now be made to FIGURES 5 and 6 of the drawings for a detailed description of the fluid cell and electric heater, after which the manner of mounting the assembly in the housing 18 will be described for a clearer understanding of the invention.

An important part of the present invention, whereby efficiencies much higher than those of the conventional electric units of the radiant or finned type are produced, is best shown in FIGURES 5 and 6 of the drawings. This assembly thus comprises a liquid unit 80 having front and rear liquid cells 82 and 84 connected by upper and lower convection tubes 86 and 88. The front and rear liquid cells 82 and 84 are of hollow configuration and include front and rear walls 90, 92 and 94, 96. Also, as shown in FIGURE 5, the front cell 82 includes ends 98 and 100 and the rear cell 84 includes ends 102 and 104. Also, as best shown in FIGURES 3 and 6, the front cell 82 is slightly larger at the bottom, tapering toward the top, and the rear cell is the reverse, tapering from a larger top to a smaller dimension at the bottom.

The front cell 82 also, as best shown in FIGURES 3 and 6 is slightly shorter in vertical height than the rear cell and the two cells are spaced a short distance apart, and in parallel relationship to each other.

From the upper left end of the front cell, the upper convection tube 86 extends rearwardly and slants upwardly to the top of the left end wall 102 of the rear liquid cell 84. In FIGURE 5 it will be noted that the lower front end 106 of the upper convection tube extends a short distance within the interior of the front liquid cell and that the longer and higher rear end extends well within the interior of the rear liquid cell 84, terminating at about the medial portion thereof.

The lower convection tube 88 extends generally horizontally between the bottom left end of the rear cell 84 and the bottom left end of the front cell 82. As best shown in FIGURE 5, the shorter rear end 110 of the lower convection tube 88 extends only a short distance within the interior of the rear liquid cell 84. However, the longer front end 112 of the lower convection tube 88 extends well into the interior of the front liquid cell 82, terminating at about the median portion thereof. Thus full convection flow through both units is provided.

FILLING THE CELLS AND PROVIDING THE EXPANSION SPACE

As shown in FIGURE 6, a fill tube 113 is provided on top of the rear cell 84 to accommodate a plug 115. These elements provide an important aspect of the invention for filling the front and rear cells 82 and 84 to prevent gurgling noises and provide a space for expansion and contraction of the liquid and proper circulation within the two cells. In filling, plug 115 is removed and fluid is added cold to a level sufficiently high that upon heating of the unit to operating temperatures, the fluid will expand and completely fill to the top of the tube 113. The plug 115 is then applied, suitable sealing compound being used on the threads to provide a permanent seal and thereafter the unit is ready for operation. Subsequent cooling leaves a vapor vacuum space along the top of the rear unit and that is the reason why the top of the rear cell is above the top of the front cell so that the vapor space always remains in the back cell. When the unit is subsequently heated, after cooling, expansion again fills the vapor space formed by the previous contraction, providing a fluid full unit and thus no popping noises, gurgling or other sounds are produced by the improved heater of the present invention.

An electrically actuated heating element 114 is positioned between the front cell 82 and the rear cell 84 and extends in parallel relationship between these units.

MOUNTING OF THE HEATER-LIQUID CELL ASSEMBLY WITHIN THE HOUSING 18

As best shown in FIGURES 3 and 4, a central baffle member 116 of generally L-shaped configuration comprises a vertically extending plate portion 118 and a horizontally extending plate portion 120. The vertical plate portion 118 is provided along its bottom edge with attaching dimples 122, FIGURE 3, spaced along the length thereof, that are welded to the lower edge of the front wall 94 of the rear cell 84. About three such attachment points are provided in a heater having a 48 inch run. Also, similar attaching dimples are formed along the top medial portion of the vertical plate 118 for attachment adjacent the top edge of the front wall 94 of the rear cell 84. Attachment is also made as by welding. It is by means of this central baffle 116 that the liquid unit 80 and heater 114 are supported within the housing 18 at two spaced points.

By reference to FIGURE 4, it will be noted that a generally U-shaped mounting bracket 124 is placed at the left hand end of the housing 18 with one of the arms 126 secured to the back wall 26 at about the center line thereof. The other arm 128, as seen in FIGURE 4 extends parallel to the rear wall and is spaced from the rear wall by the web 127 to lie at about the transverse center of the unit.

Also, as shown in FIGURE 4, a similar U-shaped bracket 130 is provided at a point about three-fourths of the way between the left end and the right end of the housing 18. This U-shaped mounting bracket 130 also has a rear arm 132 inter-connected by a bight portion or web 134 to a front arm 136, the arms being parallel to each other with the rear arm secured to the back wall 26 of the housing 18 as by spot welding and the front arm positioned about midway between the rear wall and the open front 20 of the housing 18.

The central baffle 116, as best shown in FIGURE 4, is provided at its left end with an L-shaped bracket 138, secured as by spot welding, and an aperture is formed in the bracket in line with an aperture formed in the front arm 128 of the U-shaped mounting bracket 124. With the central baffle 116 in position, supporting the liquid cell 80, attachment is made as by bolting as illustrated at 140. This procedure is also repeated near the right end of the unit by providing a hole through the central baffle 116, in alignment with a hole in the front arm 136 of the U-shaped mounting bracket 130 and securement is effected by bolting as at 142.

MOUNTING THE ELECTRIC HEATER

As best shown on FIGURES 2 and 4, the L-shaped bracket 138 is provided with an aperture adjacent its forward edge as at 144 and a spring 146 has one end looped through the aperture and has the other end looped through an aperture as at 148, formed in the left hand end of the electric heater 114. At the right end of the heater 114, a bolt 150 is provided that is locked at its head end by a lock nut 152 in a suitable aperture in the central baffle 116. A sleeve spacer 154 is next positioned on the bolt 150 and the electric heater 114 positioned thereon by means of a suitable aperture formed in the "dead" end of the heater and a second lock bolt 156 is applied to secure the assembly. By this configuration, the heater 114 is spaced between the front liquid cell 82 and the central baffle 116. Suspension at the left end by means of the spring 146 accommodates contraction and expansion of the heater 114 during its heating and cooling cycles.

THE ELECTRIC WIRING

As will be noted in FIGURE 4, two electric lead wires 158 and 160 lead from the terminal box 48 through grommeted opening 50 to insulated terminals 162 and 164 formed on the heater 114. A thermostat assembly 166 is connected into the lead line 160 and has the control rod 77, previously mentioned, which passes through an aperture in the front plate 68 and the control knob 78 is applied for adjusting the heat of the unit.

ALIGNMENT OF THE UNITS

As shown in FIGURES 3 and 4, a pair of spacer bars 170 of generally U-shaped configuration have one arm attached as by welding to the back lower edge of the central baffle 116 with the web spacing the other arm forwardly in front of the heater 114. These cooperate with the spring 146 to keep the heater 114 in proper alignment between the central baffle 116 and the front cell 82. Also, as shown in FIGURES 2 and 3, a spacer rod 172 extends between the right ends of the cells 82 and 84 to provide spaced alignment of these units. Spacer rod 172 is suitably welded to the bottom edges of the front and rear cells, extending beneath the heater 114 to provide the desired spacing.

Also, as shown in FIGURES 2, 3 and 4, a shield 174 of generally L-shaped section is fitted over the bolt 150 by a suitable aperture, being retained by the nut 156 to lie in protecting spaced relation over the right hand end of the heater 114. This serves as a protective guard around the terminals 162 and 164, to avoid accidental contact by a workman as when servicing the unit.

OPERATION OF THE INVENTION

From the foregoing description, it will be observed that the thermostatically controlled electric heater 114 is of elongated configuration, lying generally centrally between the front liquid cell 82 and the rear liquid cell 84. However, the central baffle 116 is positioned between the heater 114 and the rear cell 84 thus shielding the rear cell from radiation by the heater 114.

When electricity is introduced into the heater 114, it becomes hot, thus heating the surrounding air by thermal contact and the heated air moves upwardly and out of the unit through the upper outlet 71 by convection flow. Simultaneously, cooler air is drawn from the floor area 16 of the dwelling into the lower air inlet 73 for heating and convection flow upwardly. Thus, the electric heater instantly becomes a convection unit for providing immediate comfort.

As the electric heater 114 continues to operate, a second action takes place. Thus the heater radiates, but to the front cell 82 only, because it is shielded from radiating to the rear cell by the central baffle 116. By heating the front cell 82, the liquid contained therein becomes heated, converting the front cell into a convection heating unit. Thus, air will flow through the lower air inlet 73 upwardly around both front and rear walls 90 and 92 of the front cell 82 and become heated to pass out through the upper air outlet 71, thus supplementing substantially the convection heat produced by the electric heater 114.

After the front cell 82 becomes thoroughly warm, a third action takes place in that the fluid contained therein is heated and rises, passing upwardly through the upper convection tube 86 in the arrow 180 direction and then rightwardly and out of the longer and higher rear end 108 of the convection tube 86 to flow in an arcuate manner in the arrow 182 direction around the right hand end of the rear cell 84, returning downwardly as it cools to the shorter rear end 110 of the lower convection tube 88. Thereafter return through lower tube 88 is effected along the arrow 184 direction through the longer front end 112 of the lower convection tube, being discharged into the cell 82 to flow around the right end thereof in the arrow 186 direction for heating and repeat of the flow cycle.

In view of the foregoing convection flow, it will be understood that the third action taking place in the unit is the heating up of the rear cell 84, thus converting it into a convection cell or convection heating unit so that air lying adjacent the front and rear walls 94 and 96 thereof becomes heated to pass upwardly and out of the upper air outlet 71, drawing cooler air through the lower air inlet 73 to provide full convection flow at full operating conditions.

In view of the fact that the heater 114 radiates to the central baffle 116, it also becomes a convection unit, heating the air adjacent its front and rear surfaces for still more convection flow.

COMPLETE CONVECTION

As shown in FIGURE 3, it will be understood that substantially all of the radiation produced by the heater 114 will be absorbed by the front cell 82 and by the central baffle 116. When the surfaces of these units are dulled to prevent reflectivity, radiation losses are practically nil and substantially all radiant energy is converted into convection energy by absorption of the front cell and central baffle, and transmittal by the front cell to the rear cell for total convection heating.

Thus, air flowing into the lower air inlet 71 passes upwardly around all surfaces of the heater 114, all surfaces of the front cell 82 and the rear cell 84, and the central baffle 116, providing complete convection flow from the radiation produced by the heater 114.

It will be noted that the housing 18 is designed to provide air flow so calibrated as to control the continuous operating temperature of the heating element for long and trouble-free operation. Also, the location of the heating element 114 in relation to the air flow has been so provided to properly control air flow in relation to current density utilized in the unit.

SPECIFIC EXAMPLE

To illustrate the advantages provided by the present invention and more clearly bring out the characteristics thereof as contrasted to an electric heater of current design, comparative runs were made, measuring the operating characteristics of each heater under identical conditions and taking readings of heated air produced thereby at identical time periods. The comparative data are contained in the following table, along with pertinent notes regarding the operation, housing temperatures, reading points, and so forth.

Room temperature: 55° F.
Liquid electric: 1000 watt, 48″ length.
Conventional electric: 1100 watt, 64″ length.

| Min. Run | Temp., ° F., Air Discharge 1″ From Unit | | ° F. Rise/Min. | |
|---|---|---|---|---|
| | Liquid Electric | Conventional Electric | Liquid Electric | Conventional Electric |
| 0 | 55 | 55 | 0 | 0.2 |
| 5 | 180 | 100 | 25 [6] | 8.2 |
| 10 | 225 | 150 | 9 [6] | 10.2 |
| 15 | 235 | 180 | 2 [6] | 06.2 |
| 20 | 250 | 195 | 3 [6] | 03.2 |
| 25 | 250 | 198 | 0 [6] | ¾ [2] |
| 30 | 250 | 200 | 0 [6] | ½ [2] |
| 35 | 250 | 200 | 0 [6] | 0.3 |
| 40 | 260 | [1] 210 | 2 [6] | 2.4 |
| 45 | 260 | 210 | 0 [7] | 0.5 |

| Min. Off | | | ° F. Drop/Min. | |
|---|---|---|---|---|
| 5 | 160 | 160 | 20 hsg. temp. 102 | 10.8 |
| 10 | 120 | 120 | 08 hsg. temp. 100 | 8.8 |
| 15 | 100 | 100 | 04 hsg. temp. | 4.8 |
| 20 | 90 | 90 | 2½ cell temp. 120 | 2½ fin temp. 106. |
| 25 | 90 | 80 | 0 cell temp. 112 | 2½ fin temp. 94. |
| 30 | 85 | 75 | 1 cell temp. 104 | 1 fin temp. 86. |
| 35 | 85 | 70 | 0 cell temp. 100 | 1 fin temp. 80. |
| 40 | 80 | | 1 cell temp. 94 | |
| 45 | 80 | | 0 cell temp. 92 | |
| 50 | 80 | | 0 cell temp. 88 | |
| 55 | 78 | | 0 cell temp. 86 | |
| 60 | 76 | | Cell temp. 84 | |
| 65 | 75 | | Cell temp. 83 | |
| 70 | 75 | | Cell temp. 81 | |
| 95 | 72 | | Cell temp. 76 | |

[1] Fin temp. when operating.
[2] Reading 34″ from left end of heater.
[3] Reading 8″ from left end (this section is hottest on fin check 370°).
[4] 8″ from left end 2 degree rise (reading shows variation of heat of fins).
[5] Cut off current.
[6] Reading 24″ from left end of heater.
[7] Housing temp. 104°.
[8] Reading 8″ from left end.

From the foregoing, it will be observed that the liquid electric heater of the present invention provided a more accelerated temperature rise pattern than the conventional electric heater, even though after the initial five minutes where greatest rise per minute was attained, the temperature rise of the liquid electric unit was closely related to the temperature rise of the conventional electric unit. These comparative data show that comfort was produced faster by the liquid electric unit of the present invention than by the conventional electric unit.

During the off cycle, a particular advantage of the present invention was brought out wherein at the end of 35 minutes the conventional unit had cooled to 70° and was thereby ready to recycle. In contrast, the unit of the present invention was still at 85° at the end of 35 minutes and continued to produce heat until the end of 95 minutes, thus substantially doubling the time for cycling as compared to a conventional unit. Obviously, the savings in start-up electricity will be 50% as compared to the more rapid cycle of the conventional unit.

EXTENDED SCOPE OF THE INVENTION

Although not shown in the drawings, an insulating chamber comprising either an empty hollow housing or a hollow housing filled with dry insulation may be applied to the back of the housing 18 to protect the walls to which the unit is attached from possible heat damage and prevent heat loss from the back of the unit.

Liquids adapted to use in the invention include water containing suitable anti-rust additives and if desired, anti-freeze additives; and other suitable low vapor pressure materials of good heat transfer properties.

The unit shown and described in the specific embodiment of the invention was adapted to be operated on 110 volt electric current of the alternating type; however, it is to be included within the scope of the invention to utilize substantially any electric heater 114, adapted to a particular current such as 220, 400 or the like with suitable controls provided therefor.

Also, the specific embodiment described in the foregoing description related to a heater approximately 6½ inches high by 3 inches deep by 48 inches long. However, these dimensions may be altered without departing from the scope of the invention. Also, the principle of the present invention can be applied to wall type heaters, floor inserted types, duct types for booster heat, portable types, ceiling inserts, and the like in addition to the baseboard heater unit shown and described. Also, it is to be included within the scope of the invention to extend the length of the housing and provide a humidifier therein, by connection with a suitable water supply, to humidify the air as it flows through the unit.

While the foregoing description has related to the generation of heat radiation by means of an electrically actuated element, it is to be included within the broad scope of the invention to utilize any radiation-producing source. Thus, gas-powered radiants such as catalytic burners, oil-fired radiants and the like can be substituted for the heating rod or element disclosed above, with appropriate engineering modification. Thus, the broad scope of invention encompasses the production of radiant heat energy and directing the same into the fluid cell unit described.

ADVANTAGES OF THE PRESENT INVENTION

From the foregoing it will be observed that the present invention provides a number of advantages over conventional electric heaters utilizing only radiant or convection heat without the benefit of a fluid cell as encompassed within the scope of the present invention. Thus, from the foregoing data, it is clear that quick comfort is provided by the present unit, in fact the comfort so provided is more rapid than the conventional unit, even though at the early stage of operation, the fluid cells of the invention are not fully operating.

Also, it is a unique aspect and advantage of the present invention that a substantial hold-over factor is provided, resulting in longer cycle times and sustained even comfort. Thus the unit provides rapid initial comfort by convection from heater 114, then a heat buildup in the liquid cells to reduce cycling and on-off operating costs. Thus greater efficiencies are provided with less cycling expense, and a greatly improved comfort factor.

Also, in view of the shielding of the front cover by the front liquid cell, the front cover does not become hot and therefore danger of burning as of children's hands is avoided.

I claim:

1. In a space heater of the convection flow type, an elongated radiant heating element, a first liquid cell positioned in alignment along one side of said element to receive radiation therefrom, a second liquid cell positioned in alignment along the other side of said element, means shielding said second cell from said element, and means connecting said first and second cells in convection fluid flow relation.

2. In a space heater of the convection flow type, an elongated electric heating element, a first liquid cell positioned in alignment along one side of said heating element in radiation-absorbing relation thereto, said first cell being of elongated flattened hollow configuration and having its longitudinal axis horizontally disposed, said first cell also having a vertical axis, a second liquid cell positioned in alignment along the other side of said element, said second cell being of elongated flattened hollow configuration and having its longitudinal axis horizontally disposed, said second cell also having a vertical axis and an enlarged portion positioned above the top of said first cell, a first fluid conduit extending from the top of one end of said first cell into the top of one end of said second cell and terminating medially within the length of said second cell, and a second fluid conduit extending from the bottom of said one end of said second cell into the bottom of said one end of said first cell and terminating medially within the length of said first cell.

3. The combination defined in claim 2 wherein said first and second cells are fluid sealed, with a removable filling orifice positioned on top of said second cell.

4. In a spaced heater of the convection flow type, a first liquid cell of elongated flattened configuration having a hollow interior of larger base than top dimension, a second liquid cell of elongated flattened configuration having a hollow interior of larger top than base dimension, said cells being positioned in alignment with said larger top of said second cell positioned on a level above the top of said first cell, a first fluid conduit extending from the top of one end of said first cell into the top of one end of said second cell and terminating medially of the length of said second cell, and a second fluid conduit extending from the bottom of said one end of said second cell into the bottom of said one end of said first cell and terminating medially of the length of said first cell.

5. The combination defined in claim 4 wherein said cells are fluid filled and wherein said second cell is provided along its top with a sealable liquid-receiving opening.

6. In a space heater, an elongated heating element of the radiating type, a first liquid cell positioned in alignment along one side of said element to absorb radiation therefrom, a second liquid cell positioned in alignment along the other side of said element, a heat-absorbing baffle positioned between said second cell and said heater, means connecting said first and second liquid cells in convection fluid flow relation, and a housing surrounding said cells and element in gas flow relation.

7. In a space heater of the convection flow type, first and second liquid cells positioned in generally horizontal array and in generally parallel alignment, means connecting said cells in liquid convection flow relation, means sealing said cells to form a closed system, a housing surrounding said cells in vertical gas flow relation, and radiant heating means positioned to radiate to one of said cells to heat the same, whereby fluid therefrom is conducted into said second cell for heating the same by liquid convection flow.

8. In a space heater of the convection flow type, an elongated electric heater element, a first liquid cell positioned in alignment along one side of said element to receive radiation therefrom, a second liquid cell positioned in alignment along the other side of said element, means connecting said first and second liquid cells in convection flow relation, a central baffle plate positioned in shielding radiant energy absorbing relation between said second cell and said element, means mounting said element and said cells to said central baffle plate, a housing of generally rectangular section surrounding said element-cell assembly, said housing having a back wall, top, bottom and open front, said central baffle having a portion extending generally parallel to said housing top when said element-cell assembly is positioned therein, means mounting said central baffle plate to said housing to support said element and cells in spaced relation to said back wall, top and bottom thereof, and a front cover plate partially closing said open front of said housing to provide a lower cold air inlet opening and an upper heated air outlet opening.

9. In a space heater,
an elongated radiant heating element,
fluid filled cell members positioned along each side of said element connected in convection flow relation only, and vapor sealed,
radiation intercepting means between one of said cell members and said element,
and means for directing air over said element, said cells and said radiation intercepting means.

10. In a space heater,
a radiant heating element, a sealed, fluid filled cell positioned along each side of said element, said cells being connected in convection flow relation to absorb radiation from said element, radiation intercepting means between one side of said element and one of said cells, and means for directing air over said element, said cells and said radiation intercepting means.

References Cited by the Examiner

UNITED STATES PATENTS

| | | | |
|---|---|---|---|
| 1,114,404 | 10/1914 | Smith | 219—362 |
| 1,625,989 | 4/1927 | Duffie | 219—341 |
| 1,713,013 | 5/1929 | Wandless | 219—540 X |
| 1,863,882 | 6/1932 | Scharf | 219—365 X |
| 1,880,973 | 10/1932 | Myers | 219—341 |
| 1,923,083 | 8/1933 | Fisher | 219—367 X |
| 2,066,127 | 12/1936 | Slayter | 219—341 |
| 2,126,918 | 8/1938 | Phillips | 219—365 |
| 2,256,049 | 9/1941 | Gallup | 219—377 |
| 2,438,834 | 3/1948 | Wartes | 219—283 X |
| 2,606,993 | 8/1952 | Geoffrion | 219—342 |
| 2,944,138 | 7/1960 | Goff | 219—367 |
| 3,031,563 | 4/1962 | Koester | 219—341 X |
| 3,071,677 | 1/1963 | Mast | 219—367 |

FOREIGN PATENTS

| | | |
|---|---|---|
| 635,674 | 1/1938 | France. |
| 431,174 | 6/1926 | Germany. |

ANTHONY BARTIS, *Acting Primary Examiner.*

RICHARD M. WOODS, *Examiner.*